United States Patent
Johnson

(10) Patent No.: US 12,382,956 B2
(45) Date of Patent: Aug. 12, 2025

(54) ANTIMICROBIAL COMPOSITIONS AND METHODS FOR TREATING PLANT DISEASES

(71) Applicant: Thomas D. Johnson, Buffalo, SD (US)

(72) Inventor: Thomas D. Johnson, Buffalo, SD (US)

( * ) Notice: Subject to any disclaimer, the term of this patent is extended or adjusted under 35 U.S.C. 154(b) by 315 days.

(21) Appl. No.: 17/516,229

(22) Filed: Nov. 1, 2021

(65) Prior Publication Data

US 2023/0134724 A1     May 4, 2023

(51) Int. Cl.
| | | |
|---|---|---|
| A01N 43/16 | (2006.01) | |
| A01G 7/06 | (2006.01) | |
| A01N 37/18 | (2006.01) | |
| A01N 59/00 | (2006.01) | |
| A01P 1/00 | (2006.01) | |

(52) U.S. Cl.
CPC ............ *A01N 43/16* (2013.01); *A01G 7/06* (2013.01); *A01N 37/18* (2013.01); *A01N 59/00* (2013.01); *A01P 1/00* (2021.08)

(58) Field of Classification Search
CPC .......... A01G 7/06; A01N 25/02; A01N 59/00; A01P 1/00
USPC ................ 47/1.01 R; 424/405; 523/122; 504/116.1
See application file for complete search history.

(56) References Cited

U.S. PATENT DOCUMENTS

| | | | | |
|---|---|---|---|---|
| 2,801,950 A | * | 8/1957 | Tate ................ | A01N 63/28 424/114 |
| 2,909,466 A | * | 10/1959 | Neumann ........... | A61K 31/65 514/153 |
| 4,112,617 A | * | 9/1978 | Purviance ........... | A01G 7/06 401/190 |
| 4,173,702 A | * | 11/1979 | Gorman .............. | C12P 35/08 540/215 |
| 9,497,964 B2 | * | 11/2016 | Dagher .............. | A01N 37/16 |
| 10,349,645 B2 | | 7/2019 | Kitajima et al. | |
| 2013/0259957 A1 | * | 10/2013 | Dagher .............. | A01N 37/16 424/722 |
| 2017/0112131 A1 | * | 4/2017 | Meadows ........... | A01N 37/10 |
| 2020/0255851 A1 | * | 8/2020 | Thompson .......... | C07K 14/415 |

(Continued)

FOREIGN PATENT DOCUMENTS

| | | | | |
|---|---|---|---|---|
| CN | 105801246 | | 3/2016 | |
| CN | 105668684 A | * | 6/2016 | ............. C02F 1/286 |
| CN | 105801246 A | * | 7/2016 | ............. A01N 43/16 |

(Continued)

OTHER PUBLICATIONS

PurdueExtensionEntm, Tree Injection by a Professional Applicator for Emerald Ash Borer, 2012, YouTube, https://www.youtube.com/watch?v=U6HL3MJ8JKM (Year: 2012).*

(Continued)

*Primary Examiner* — Kimberly S Berona
*Assistant Examiner* — Kevin M Dennis

(57) ABSTRACT

An antimicrobial composition for treating plant diseases includes a solvent into which an antibiotic is substantially dissolved to achieve a concentration of the antibiotic sufficient to treat a bacterial infection in a plant. An acid is added to the solvent at a concentration sufficient to generate a pH in a range of 1.5 to less than 4.0. The antimicrobial can be delivered systemically to a plant, thereby allowing the antibiotic to treat a bacterial disease inflicting the plant.

4 Claims, 6 Drawing Sheets

(56) References Cited

U.S. PATENT DOCUMENTS

2020/0329710 A1* 10/2020 Farmer .................. A01N 43/22

FOREIGN PATENT DOCUMENTS

| CN | 108294049 B | | 1/2018 | |
|---|---|---|---|---|
| JP | 2005232050 A | * | 9/2005 | |
| WO | WO-2005104843 A2 | * | 11/2005 | ............. A01N 25/30 |
| WO | WO2019173810 | | 3/2018 | |
| WO | WO-2019064219 A1 | * | 4/2019 | |

OTHER PUBLICATIONS

The Determination of Optimal Concentration and PH of Tetracycline Hydrochloride for Trunk Injection of Greening Citrus Trees. Author: VanBurren Published Mar. 17, 1976.

Effect of Growing Media PH on Peformance of Haunglongbing-Affected Young Citrus Trees Author: Shazad; Published Jan. 13, 2021.

B. Aubert and J.M. Bové, Effect of Penicillin or Tetracycline Injections of Citrus Trees Affected by Greening Disease Under Field Conditions in Reunion Island, p. 103-108, In: Proceedings of the Eighth Conference of the International Organization of Citrus Virologists, 1980. See at: https://escholarship.org/uc/item/9w33200r.

Oxytetracycline hydrochloride https://www.chemicalbook.com/ChemicalProductProperty_EN_CB9311671.htm.

P. Punamiya, D. Sakar, S. Rakshit and R. Datta. Effectiveness of Aluminum-based Drinking Water Treatment Residuals as a Novel Sorbent to Remove Tetracyclines from Aqueous Medium, J. Environ. Qual. Sep. 2013; 42(5):1449-1459. See at: https://pubmed.ncbi.nlm.nih.gov/24216422/.

C.H. Buitendag and G.J. Bronkhorst, Micro Injection of Citrus Trees with N-Pyrrolidinomethyl Tetracycline (PMT) for the Control of Greening Disease, In: The Citrus and Subtropical Fruit Journal, Apr. 1983. See at: https://swfrec.ifas.ufl.edu/hlb/database/pdf/00001572.pdf.

Tetracycline Hydrochloride https://www.sigmaaldrich.com/deepweb/assets/sigmaaldrich/product/documents/348/160/t3383pis.pdf.

Control of Citrus Greening and its Psylla Vector by Trunk Injections of Tetracyclines and Insecticides, R.E. Schwarz, J. N. Moll, and S. P. van Vuuren. http://dx.doi.org/10.5070/C56189m3pk Retrieved from https://escholarship.org/uc/item/6189m3pk.

Control of Citrus Huanglongbing via Trunk Injection of Plant Defense Activators and Antibiotics, J. Hu, J. Jiang, and N. Wang (Dec. 14, 2017). Phytopathology® 2018 108:2, 186-195. https://apsjournals.apsnet.org/doi/epdf/10.1094/PHYTO-05-17-0175-R.

Effect of Growing Media PH on Peformance of Haunglongbing-Affected Young Citrus Trees Author: Shazad; Published 0-13-2021.

* cited by examiner

ANTIMICROBIAL COMPOSITIONS AND METHODS FOR TREATING PLANT DISEASES

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

Bacterial diseases of perennial plants have been a source of concern for agriculture for many years. Bacterial diseases spread rapidly, often by wind, rain, or vectoring by an insect. When conditions are favorable, these bacterial pathogens can grow quickly and cause irreversible damage to a crop. Of particular note are vascular tissue colonizing bacterial species. Due to a relatively slow growth rate, these pathogens may not be detected for several growing seasons and already will have begun to negatively impact tree and vine health. Because perennial plants require a number of years to achieve productivity, any colonization by a bacterial pathogen will have long-term implications on the economic viability of the crop. Though not exhaustive, *Erwinia* spp., *Psuedomonas* spp., *Xanthamonas* spp., *Xylophilus* spp., *Xylella* spp., *Candidatus Liberibacter* spp., and *Rickettsia* spp. are representative difficult to control pathogens which require extensive use of foliar antibiotics and insecticides to improve plant productivity and to limit their spread.

Among the most difficult to mitigate and control pathogens are vascular-colonizing bacterial species: *Candidatus liberibacter* spp., a phloem-colonizing bacterial pathogen which is the causal agent of Citrus Greening Disease/HLB, and *Xylella fastidiosa*, a xylem-colonizing bacteria that is the causal agent of Pierce's Disease in grapes, Coffee Leaf Scorch Disease in coffee plants, Citrus Variegated Chlorosis in Citrus, and Olive Quick Decline Syndrome in Olives. Because these organisms reside in the vascular tissue of these perennial species, their control is difficult due to a lack of effective antimicrobials or delivery mechanisms. Common control practices include foliar applications of antimicrobials, which suffer from poor penetration into the foliage and poor mobilization through the vascular tissue, control of insect vectors, using limited resistant rootstocks or varieties, increased fertilizer applications as an attempt to grow through the diseases, or, in dramatic and costly cases, removal of infected plants and replanting. For insect vectored plants, initial bacterial titers upon infection are low, but can reach as high as $10^7$ Colony Forming Units (CFUs) per gram fresh tissue. When multiplied out to account for the size of the roots, vines or tree limbs, and corresponding foliage, the number of bacterial colonies within the tree can seem overwhelming.

The disclosure relates to antimicrobial compositions and more particularly pertains to a new antimicrobial compositions and methods for treating plant diseases. The present invention discloses novel antimicrobial compositions and methods for their use in treating liberibacter infections in plants, and in particular infections of Candidatus Liberibacter *africanus*, Candidatus Liberibacter *americanus*, and Candidatus Liberibacter *asiaticus*, or mutants thereof in citrus trees, where they cause what is commonly known as citrus greening disease. This invention also may be used to control other perennial vascular or tissue inhabiting bacterial pathogens including Xyllela spp. *Erwinia* spp., *Psuedomonas* spp., *Xanthamonas* spp., *Xylophilus* spp., and *Rickettsia* spp.

(2) DESCRIPTION OF RELATED ART INCLUDING INFORMATION DISCLOSED UNDER 37 CFR 1.97 AND 1.98

The prior art relates to antimicrobial compositions. Prior art antimicrobial compositions for treating citrus greening disease may comprise solutions of tetracycline antibiotics and bark penetrants at a pH of 5.5-6.5 and solutions of auxins and cytokinins at a pH of 5-7 applied by spraying on plants and soil, ampicillin formulated at a pH of 6.5 or liquids obtained from *Paenibacillus polymyxa* cultures at a pH of 6.0 applied by injection, and beneficial microorganisms and their fermentation products applied to leaves, fruit, seeds, and soil. The prior art also discloses methods for forming protective layers on plants, wherein the protective layers comprise antibiotics that may prevent infections. What is lacking in the prior art is an antibiotic composition having a pH of less than 4.0, and more particularly a pH of 1.8 to 2.5, which can be delivered to the vascular network of a citrus tree to treat citrus greening disease.

(h) BRIEF SUMMARY OF THE INVENTION

An embodiment of the disclosure meets the needs presented above by generally comprising a solvent into which an antibiotic is substantially dissolved to achieve a concentration of the antibiotic sufficient to treat a bacterial infection in a plant. An acid is added to the solvent at a concentration sufficient to generate a pH in a range of 1.5 to less than 4.0. The antimicrobial composition thus is configured for systemic delivery to a plant to treat a bacterial disease inflicting the plant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF THE DRAWING

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
FIG. 1 is a representative picture of a Valencia orange tree treated by injection with a solution of oxytetracycline acidified to pH 2.
Figure 2:
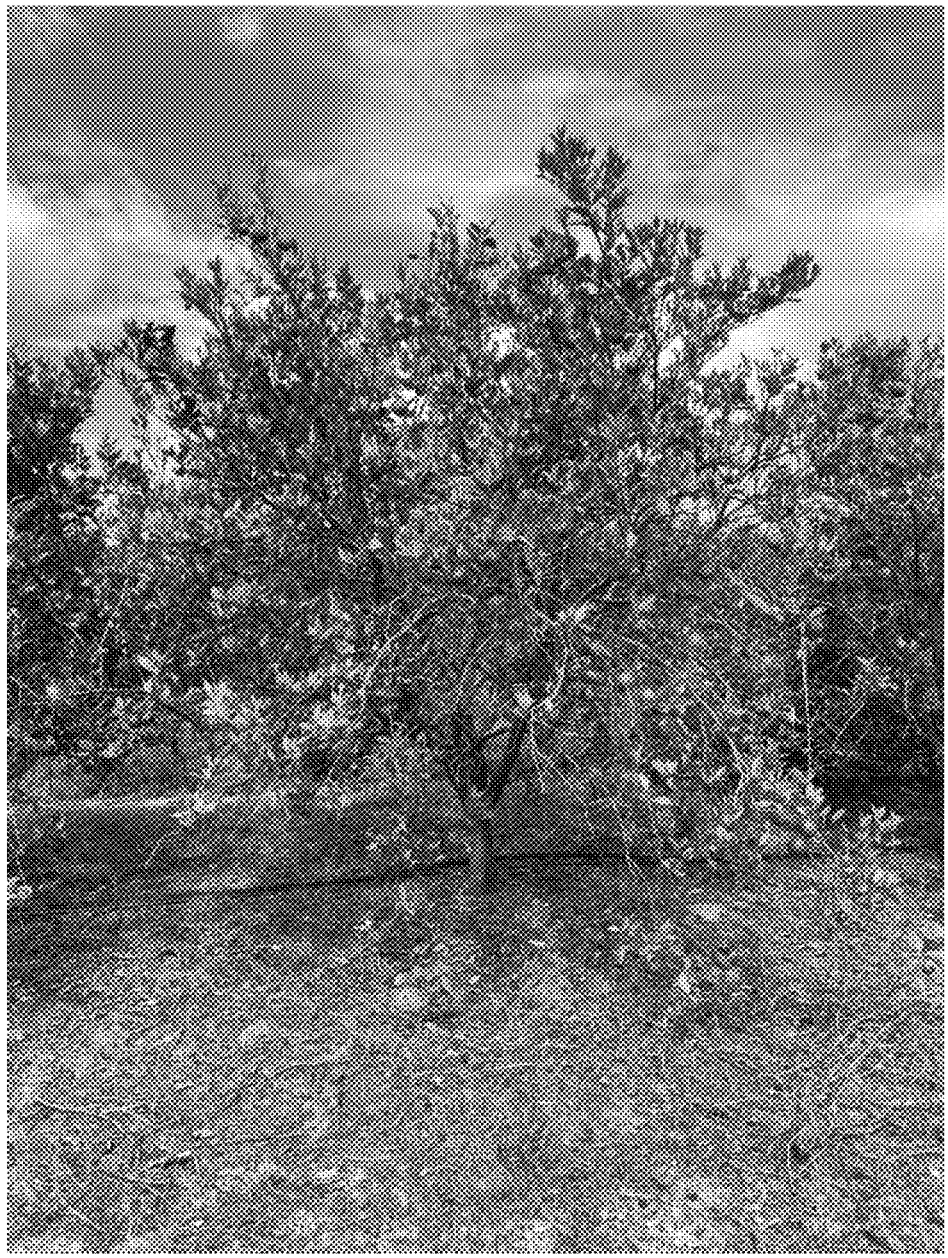
FIG. 2 is a representative picture of a Valencia orange tree treated by foliar spraying with an unacidified oxytetracycline solution.
Figure 3:
FIG. 3 is a representative picture of a Valencia orange tree treated by injection with a solution of streptomycin acidified to pH 2.
Figure 4:
FIG. 4 is a representative picture of a Valencia orange tree treated by foliar spraying with an unacidified streptomycin solution.
Figure 5:
FIG. 5 is a representative picture of an untreated Valencia orange tree.

With reference now to FIG. 1, a new antimicrobial composition embodying the principles and concepts of an embodiment of the disclosure and a method will be described.

The antimicrobial composition generally comprises a solvent into which an antibiotic is substantially dissolved to achieve a concentration of the antibiotic sufficient to treat a bacterial infection in a plant. The solvent generally comprises water, but also may include cosolvents, such as, but not limited to, alcohols, dimethyl sulfoxide, and the like. The antibiotic may comprise a tetracycline, an aminoglycoside, or the like, and thus be configured to treat a candidatus liberibacter *africanus*, a candidatus liberibacter *americanus*, or a candidatus liberibacter *asiaticus* infection in a citrus tree. The tetracycline antibiotic may comprise tetracycline, chlortetracycline, oxytetracycline, demeclocycline, lymecycline, meclocycline, methacycline, minocycline, rolitetracycline, doxycycline, tigecycline, eravacycline, sarecycline, oromadacycline, or the like. The aminoglycoside antibiotic may comprise kanamycin A, amikacinm, tobramycin, dibekacin, gentamicin, sisomicin, netilmicin, neomycin B, neomycin C, neomycin E, streptomycin, plazomicin, or the like. The antibiotic may have a concentration of 500 to 50,000 parts per million. The antibiotic may have a concentration of 500 to 25,000 parts per million. The antibiotic may have a concentration of 500-12,000 parts per million.

An acid is present in the solvent at a concentration sufficient to generate a pH in a range of 1.5 to less than 4.0. The acid may be present at a concentration sufficient to generate a pH in a range 1.8-2.5. The acid may comprise an inorganic acid, although the present invention also anticipates the acid comprising an organic acid, or a combination of an inorganic acid and an organic acid. The acid may comprise hydrochloric acid, phosphoric acid, nitric acid, acetic acid, citric acid, or the like.

The antimicrobial composition is configured for systemic delivery to a plant so that the antibiotic is configured to treat a bacterial disease inflicting the plant. The antimicrobial composition may be configured for injection into the vascular network of a tree or vine.

Figure 6:
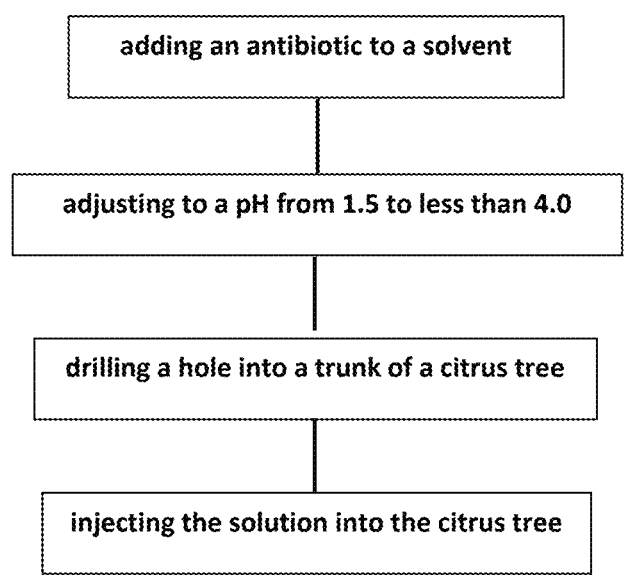
FIG. 6 is a flow diagram for a method of generating an acidified antibiotic solution and its use in treating a bacterial infection in a plant according to an embodiment of the disclosure.

The present invention anticipates a method (FIG. 6) of generating an acidified antibiotic solution and its use in treating a bacterial infection in a plant. The method comprises a first step of adding an antibiotic to a solvent in an amount sufficient to generate a first solution having a concentration of the antibiotic sufficient to treat a bacterial infection in a plant. A second step of the method is titrating the first solution using an acid to generate a second solution having a pH of from 1.5 to less than 4.0. A third step of the method is drilling a hole into a trunk of a tree or vine. A fourth step of the method is injecting the second solution into a vascular network of the tree or vine. As will be apparent to those of ordinary skill in the art, the order of addition of the antibiotic and the acid to the solvent can be reversed upon determination of the quantities of each required to achieve a desired pH of the antibiotic solution.

Provided below are detailed examples of the antimicrobial compositions for treating plant diseases and methods for their use in treating bacterial infections in plants. These examples should not be viewed as limiting regarding compositions, methods of preparation and use, or plant species.

I. Definitions

Tree Vigor Ratings: 1=Lowest Vigor; 5=Highest Vigor. LSD stands for least significant difference and C.V. stands for Coefficient of Variance. "a" denotes the corresponding value is significantly different from any other value that does not contain the letter "a". Similarly, "b" denotes the corresponding value is significantly different from any other value that does not contain the letter "b"

II. Valencia Orange Tree Trials

A. Oxytetracycline

Table 1 below provides the results this study. For Treatment 1, a 5,500 ppm solution of oxytetracycline (HCl salt, >95%) was prepared using distilled water. This solution then was acidified to pH 2 using hydrochloric acid. Each tree (n=9) was injected with 50 mL of the solution, delivering 0.275 grams of oxytetracycline·HCl. For Treatment 2, 2.5 g of oxytetracycline (HCl salt, >95%) was dissolved in 2 gallons of water. The resultant solution was sprayed onto the foliage of the trees at a rate of 1 quart (0.3125 g oxytetracycline·HCl) per tree (n=9). Vigor ratings were performed 60 days after application of treatments.

Trial conclusions: Solutions of oxytetracycline acidified to pH 2 and delivered by trunk injection were more effective than solutions of unacidified oxytetracycline applied to foliage by spraying.

TABLE 1

| Trt # | Treatment | Vigor Rating (1-5) |
|---|---|---|
| 1 | Oxytetracycline - HCl solution, injected | 3.39 a |
| 2 | Oxytetracycline - aqueous solution, sprayed | 2.67 b |
| LSD P = .05 | | 0.477 |

B. Streptomycin

Table 1 below provides the results this study. For Treatment 1, a 5,500 ppm solution of streptomycin (sulfate salt, >98%) was prepared using distilled water. This solution then was acidified to pH 2 using hydrochloric acid. Each tree (n=9) was injected with 50 mL of the solution delivering 0.275 g streptomycin·$SO_4$. For Treatment 2, 4.12 g of streptomycin (sulfate salt, >98%) was dissolved in 2 gallons of water. The resultant solution was sprayed onto the foliage of the trees at a rate of 1 quart (0.515 g streptomycin $SO_4$) per tree (n=9). Vigor ratings were performed 60 days after application of treatments.

Trial conclusions: Solutions of streptomycin acidified to pH 2 and delivered by trunk injection were more effective than solutions of unacidified streptomycin applied to foliage by spraying.

TABLE 2

| Trt # | Treatment | Vigor Rating (1-5) |
|---|---|---|
| 1 | Streptomycin - HCl solution, injected | 3.61 a |
| 2 | Streptomycin - aqueous solution, sprayed | 2.94 b |
| LSD P = .05 | | 0.512 |

Table 3 represents a working example on dosing a desired amount of antimicrobial agent into a tree or vine. Factors that could alter the dosage include overall plant health, i.e., a decline in vascular biomass caused by the pathogen, hedging and pruning, and environmental factors, such as temperature, moisture, and stress.

TABLE 3

| Trunk Diameter (inches) | Antibiotic (PPM) | Volume Injected (mL) | Antibiotic (g per Tree/Vine) |
|---|---|---|---|
| 1.25-1.75 | 550-1,100 | 25 | 0.014-0.028 |
| 1.75-2.12 | 550-2,200 | 50 | 0.027-0.11 |
| 2.12-3.00 | 5,500-11,000 | 25 | 0.14-0.28 |
| 3.00-4.25 | 5,500-11,000 | 50 | 0.28-0.55 |
| 4.25-6.00 | 5,500-11,000 | 100 | 0.55-1.10 |
| >6.00 | 5,500-11,000 | 200 | 1.10-2.20 |

Generally, the volume of treatment injected would be proportional to a diameter of a trunk of a tree. Trees having vascular networks damaged by disease would be treated at lower concentrations to prevent phytotoxicity. As the trees recover, the concentration can be increased to mitigate risk of reinfection.

Although the foregoing invention has been described in some detail by way of illustration and example for purposes of clarity and understanding, it will be readily apparent, in light of the teachings of this invention, that certain changes and modifications may be made thereto without departing from the spirit or scope of the following claims.

Therefore, the foregoing is considered as illustrative only of the principles of the disclosure. Further, since numerous modifications and changes will readily occur to those skilled in the art, it is not desired to limit the disclosure to the exact compositions and methods of use, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A method of generating an acidified antibiotic solution and for its use in treating a bacterial infection in a plant, the method comprising the steps of:
    adding an antibiotic to a solvent in an amount sufficient to generate a first solution having a concentration of the antibiotic sufficient to treat the bacterial infection in the plant;
    titrating the first solution using an acid to generate a second solution having a pH of from 1.5 to less than 4.0;
    delivering the second solution systemically to a plant; wherein
    the solvent comprises water;
    the acid comprises an inorganic acid titrated into the first solution in an amount sufficient to generate the second solution having a pH of in a range of 1.8-2.5;
    the antibiotic comprises oxytetracycline or streptomycin;
    the antibiotic has a concentration of 500 to 25,000 parts per million; and
    the inorganic acid comprises hydrochloric acid.

2. The method of claim 1, wherein the antibiotic has a concentration of 500-12,000 parts per million.

3. A method of generating an acidified antibiotic solution and for its use in treating a bacterial infection in a plant, the method comprising the steps of:
    adding an antibiotic to a solvent in an amount sufficient to generate a first solution having a concentration of the antibiotic sufficient to treat the bacterial infection in the plant, wherein the antibiotic includes oxytetracycline;
    titrating the first solution using an acid to generate a second solution having a pH of from 1.5 to less than 4.0;
    delivering the second solution systemically to a plant; wherein systemic delivery of the second solution to the plant entails the steps of:
    drilling a hole into the rootstock or trunk of a tree or vine; and
    injecting the second solution into a vascular network of the tree or vine.

4. A citrus tree treated according to the method recited in claim 3.

* * * * *